US008791879B2

(12) United States Patent
Akimoto

(10) Patent No.: US 8,791,879 B2
(45) Date of Patent: Jul. 29, 2014

(54) APPARATUS AND METHOD FOR DRIVING DISPLAY OPTICAL DEVICE

(75) Inventor: Osamu Akimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1659 days.

(21) Appl. No.: 11/147,878

(22) Filed: Jun. 8, 2005

(65) Prior Publication Data

US 2005/0285837 A1 Dec. 29, 2005

(30) Foreign Application Priority Data

Jun. 10, 2004 (JP) ................................ P2004-173039

(51) Int. Cl.
*G09G 3/36* (2006.01)
*G06F 3/038* (2013.01)

(52) U.S. Cl.
USPC .............................. 345/30; 345/100; 345/209

(58) Field of Classification Search
USPC ........... 345/87, 88, 89, 90, 91, 92, 94, 95, 96, 345/98, 99, 100, 102, 103, 204, 205, 206, 345/208, 210, 211, 214, 215, 690, 691; 349/33, 37
See application file for complete search history.

(56) References Cited

U.S. PATENT DOCUMENTS 4,645,303 A * 2/1987 Sekiya et al. .................... 345/96
4,926,168 A * 5/1990 Yamamoto et al. ............. 345/58
5,790,092 A * 8/1998 Moriyama ...................... 345/96
6,118,421 A * 9/2000 Kawaguchi et al. ............ 345/89
6,219,019 B1 * 4/2001 Hasegawa et al. .............. 345/96
6,570,553 B2 * 5/2003 Hashimoto et al. ........... 345/100
6,614,415 B2 * 9/2003 Mizutani et al. ................ 345/90
6,680,722 B1 * 1/2004 Hiraki et al. ..................... 345/96
6,700,557 B1 * 3/2004 McKnight ........................ 345/87
6,707,442 B2 * 3/2004 Watanabe ...................... 345/100
6,781,568 B2 * 8/2004 Nishimura et al. ............. 345/96
7,002,540 B2 * 2/2006 Aoki ................................ 345/89
7,133,035 B2 * 11/2006 Kim et al. ...................... 345/204
7,382,343 B2 * 6/2008 Hiraki et al. ..................... 345/96
2002/0001056 A1 * 1/2002 Sandberg et al. ............. 349/123
2003/0122770 A1 * 7/2003 Nishimura et al. ............. 345/96
2004/0155847 A1 * 8/2004 Taoka et al. ..................... 345/87

(Continued)

FOREIGN PATENT DOCUMENTS

JP 04-299387 10/1992
JP 04-299387 A 10/1992

(Continued)

OTHER PUBLICATIONS

Japanese Patent Office Action corresponding to Japanese Serial No. 2004-173039 dated Jun. 15, 2010.

*Primary Examiner* — Kent Chang
*Assistant Examiner* — Nelson Rosario
(74) *Attorney, Agent, or Firm* — Dentons US LLP

(57) ABSTRACT

In order to prevent a burn-in phenomenon from occurring in a liquid crystal, the present invention provides a display apparatus including a liquid-crystal display device employing the liquid crystal and a driving circuit. In an operation to drive the liquid-crystal display device, the driving circuit inverts the polarity of a signal voltage applied between pixel electrodes and a facing electrode, which are employed in the liquid-crystal display device, every frame period of a moving-image signal. In the operation to drive the liquid-crystal display device, the driving circuit also changes the phase of a control signal for inverting the polarity.

12 Claims, 11 Drawing Sheets

(56) References Cited

U.S. PATENT DOCUMENTS

| | | | | |
|---|---|---|---|---|
| 2004/0178979 | A1* | 9/2004 | Watanabe et al. | 345/96 |
| 2005/0078069 | A1* | 4/2005 | Aiba et al. | 345/87 |
| 2005/0184949 | A1* | 8/2005 | Kamimura | 345/98 |
| 2006/0072664 | A1* | 4/2006 | Kwon et al. | 375/240.16 |
| 2006/0267904 | A1* | 11/2006 | Aiba | 345/98 |
| 2007/0018934 | A1* | 1/2007 | Kim et al. | 345/98 |
| 2008/0170023 | A1* | 7/2008 | Choi et al. | 345/96 |

FOREIGN PATENT DOCUMENTS

| | | | | |
|---|---|---|---|---|
| JP | 09-236787 | | 9/1997 | |
| JP | 11-133376 | | 5/1999 | |
| JP | 2000-214437 | | 8/2000 | |
| JP | 2001-042831 | | 2/2001 | |
| JP | 2002-107708 | | 4/2002 | |
| JP | 2003-337345 | | 11/2003 | |
| JP | 2004-045741 | | 2/2004 | |
| JP | 2004045741 | A * | 2/2004 | G09G 3/36 |

* cited by examiner

FIG. 9
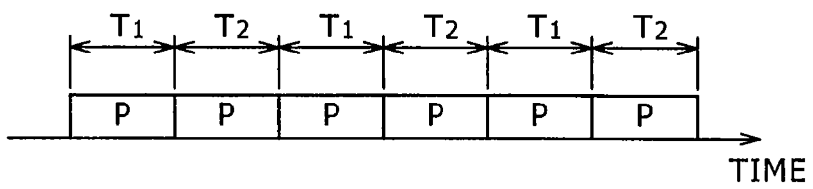
FIG. 10 - PRIOR ART
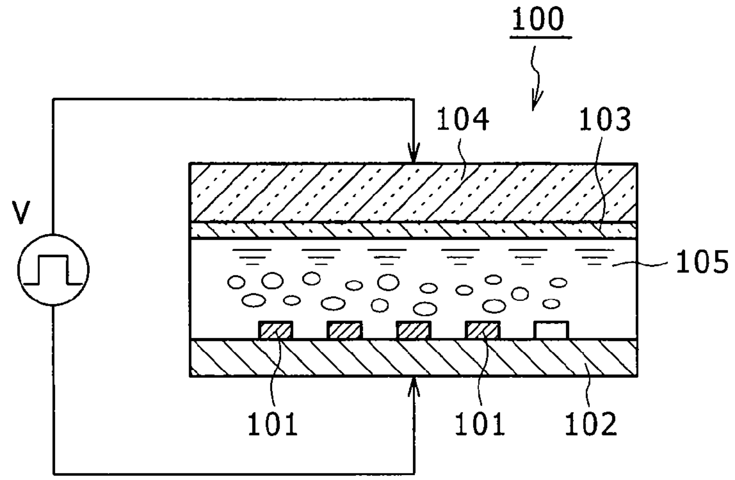
FIG. 11 - PRIOR ART
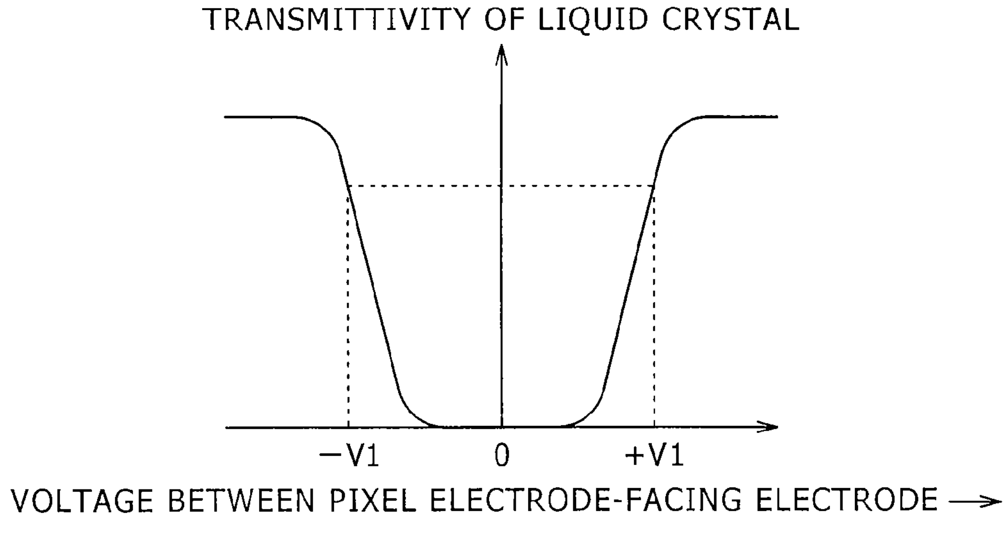

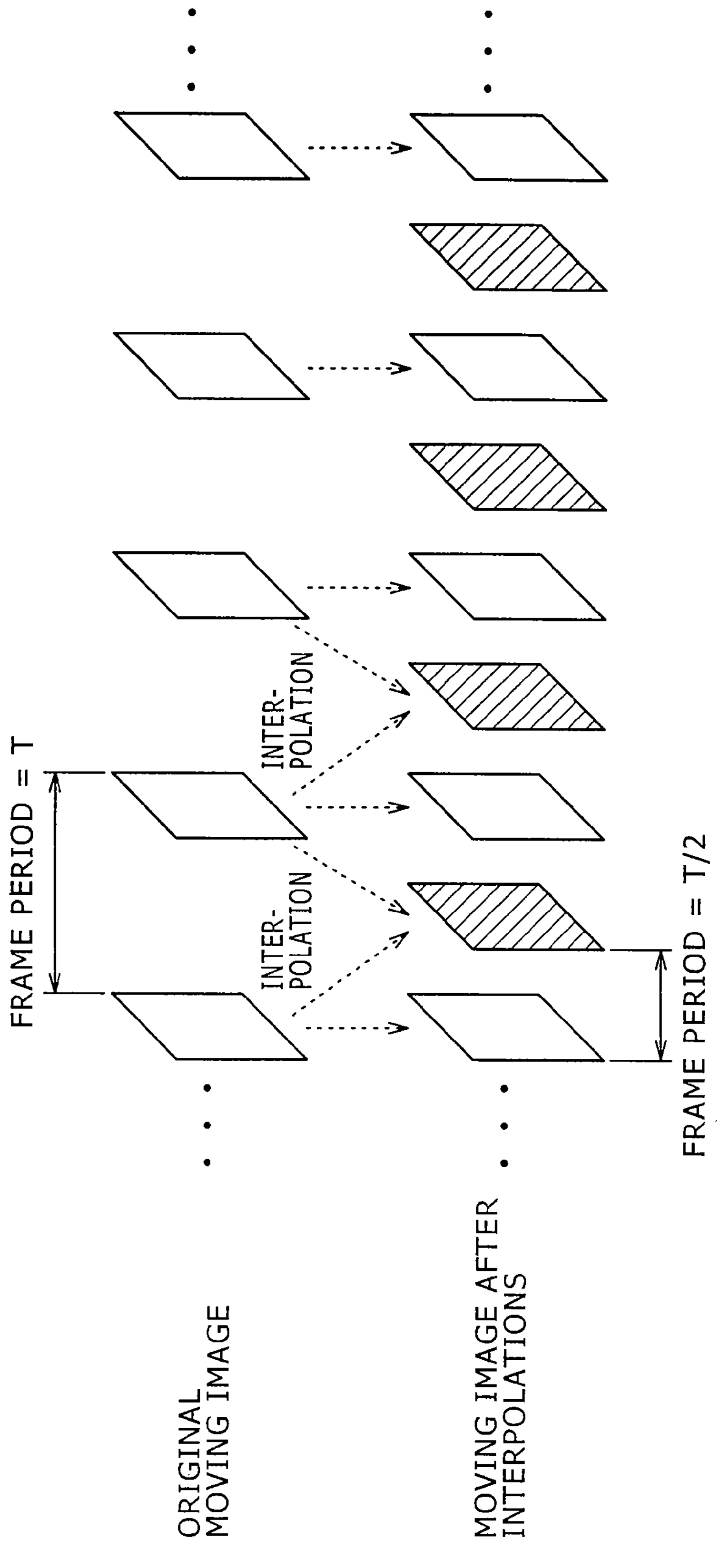
FIG. 12 - PRIOR ART

FIG. 13 - PRIOR ART
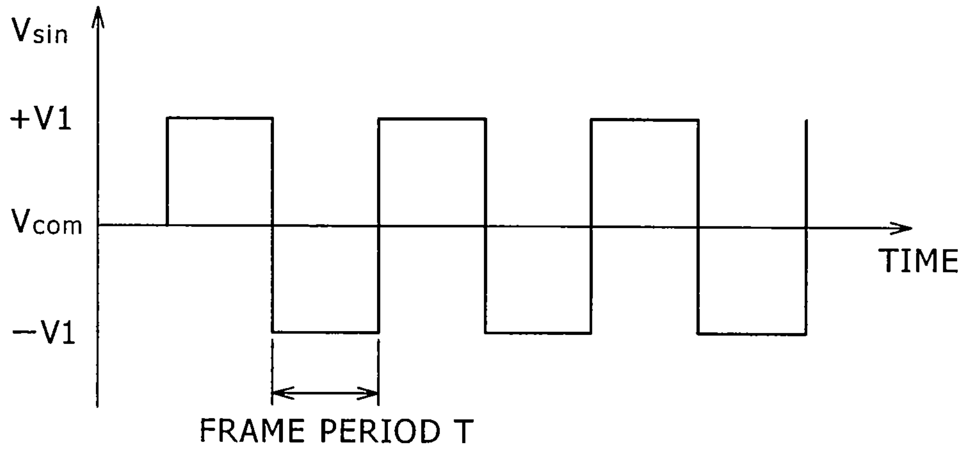

PRIOR ART

APPARATUS AND METHOD FOR DRIVING DISPLAY OPTICAL DEVICE

RELATED APPLICATION DATA

The present application claims priority to Japanese Application(s) No(s). P2004-173039 filed Jun. 10, 2004, which application(s) is/are incorporated herein by reference to the extent permitted by law.

BACKGROUND OF THE INVENTION

The present invention relates to an apparatus for driving typically a liquid-crystal display device, a method adopted by the apparatus and a display apparatus using the liquid-crystal display device.

In recent years, due to its thinness and lightness, a liquid-crystal display device is widely used as a device for displaying an image.

As shown in FIG. 10, a liquid-crystal display device 100 includes a driving substrate 102, on which pixel electrodes 101 are provided to form a 2-dimensional layout, a facing substrate 104 having a facing electrode 103 and a liquid crystal 105. The driving substrate 102 and the facing substrate 104 are attached to each other, sandwiching a gap with a predetermined thickness allowing the electrodes 101 and 103 to face each other. The liquid crystal 105 is sealed inside the gap.

The orientation of the liquid crystal 105 varies in accordance with the strength of an electric field applied to the liquid crystal 105. That is to say, the transmittivity of the liquid crystal 105 changes in accordance with the magnitude of a voltage applied between the pixel electrodes 101 and the facing electrode 103. Thus, if a voltage of an image signal is applied to a pixel electrode 101 in the liquid-crystal display device 100, the transmittivity of a portion corresponding to the pixel electrode 101 changes. As a result, if a light beam such as a backlight ray is radiated to the picture electrodes 101, an image represented by the image signal can be displayed.

As described above, the orientation of the liquid crystal 105 varies in accordance with the strength of an electric field applied to the liquid crystal 105. As shown in FIG. 11, however, the transmittivity does not change even if the polarity of the applied electric field is reversed. That is to say, the transmittivity for an electrical-potential difference of +V1 applied between the pixel electrodes 101 and the facing electrode 103 is equal to the transmittivity for an electrical-potential difference of −V1 applied between the pixel electrodes 101 and the facing electrode 103. It is to be noted that FIG. 11 is a diagram showing the transmittivity of a liquid crystal in the so-called normally black mode. A liquid crystal in the so-called normally black mode is a liquid crystal having a transmittivity of 0 for an applied electrical field of 0. However, the relation between the transmittivity and the strength of the applied electrical field shown in the figure also holds true of a liquid crystal in the so-called normally white mode. That is to say, the transmittivity does not change even if the polarity of the applied electric field is reversed. A liquid crystal in the so-called normally white mode is a liquid crystal having a maximum transmittivity for an applied electrical field of 0.

In addition, a moving-image signal is displayed in the liquid-crystal display device 100 by normally carrying out frame hold driving in which, for one frame, a voltage is applied to the pixel electrodes 101 once and the applied voltage is held continuously till the next frame is displayed to sustain the display of the current frame. In the case of the frame hold driving, however, moving-image senility is felt in the visual-sense optic of a human due to a residual image feeling. As one of methods for avoiding the senility caused by the residual-image feeling, the speed to switch an image is raised.

As one of liquid-crystal-driving methods of raising the speed to switch an image from one frame to another, there is a method whereby frames of an input moving-image signal representing an original moving image are interpolated to generate a moving-image signal having a shorter frame period as shown in FIG. 12 and the moving-image signal having a shorter frame period is displayed in a liquid-crystal display device. The moving-image signal having a shorter frame period is a signal representing a moving image after frame interpolations. By shortening the frame period, the speed to renew an image displayed on a liquid-crystal display device can be increased.

In addition, if ion biasing occurs in the liquid crystal 105, a burn-in phenomenon is observed as is commonly known. In this burn-in phenomenon, a characteristic representing a relation between a voltage and a gradation can no longer be reproduced. If the worst comes to the worst, the burn-in phenomenon results in disassembly of the material.

In order to solve the above problem, the conventional liquid-crystal display device adopts a driving method whereby the voltage applied to the liquid crystal is inverted from a positive polarity to a negative one and vice versa periodically every image-switching period, that is, every frame (or every field). For more information on this driving method, refer to a document such Japanese Patent Laid-open No. Hei 4-299387. As shown in FIG. 13, in the liquid-crystal display device 100, the polarity of a signal voltage Vsin applied to each of the pixel electrodes 101 is inverted every frame period with a common voltage Vcom taken as the center of inversion. In this case, the common voltage Vcom is a voltage applied to the facing electrode 103.

SUMMARY OF THE INVENTION

By the way, let us consider a case in which a moving image representing a stationary ball 110 serving as a white object existing on a black background image 111 is displayed on the liquid-crystal display device 100 adopting the polarity inversion driving as shown in FIGS. 14A to 14D. It is to be noted that FIGS. 14A to 14D are diagrams showing the moving image representing 4 consecutive frames.

In a frame shown in FIG. 14A as a frame appearing at a time T11, the ball 110 is displayed in a predetermined area A delimited by a dotted line on the screen. At that time, a signal voltage Vsin applied to pixel electrodes 101 in the predetermined area is for example +V1.

In a frame shown in FIG. 14B as a frame appearing at a time t12 after the time t11, the ball 110 is displayed in the predetermined area A delimited by the dotted line on the screen. At that time, the signal voltage Vsin applied to pixel electrodes 101 in the predetermined area is −V1. In a frame shown in FIG. 14C as a frame appearing at a time t13 after the time t12, the ball 110 is displayed in the predetermined area A delimited by the dotted line on the screen. At that time, the signal voltage Vsin applied to pixel electrodes 101 in the predetermined area is for example again +V1. In a frame shown in FIG. 14D as a frame appearing at a time t14 after the time t13, the ball 110 is displayed in the predetermined area A delimited by the dotted line on the screen. At that time, the signal voltage Vsin applied to pixel electrodes 101 in the predetermined area is for example again −V1.

Thus, the DC level of the signal voltage Vsin applied to pixel electrodes 101 in the predetermined area is 0. In this case, the DC level is an average of the DC levels for the four frames.

Then, let us consider a case in which a moving image representing a moving ball 110 serving as a white object existing on a black background image 111 is displayed on the liquid-crystal display device 100 adopting the polarity inversion driving as shown in FIG. 15. The ball 110 is moving in a direction. It is to be noted that FIG. 15 is a diagram showing the moving image representing four consecutive frames.

In a frame shown in FIG. 15A as a frame appearing at a time t21, the ball 110 is displayed in a predetermined area B delimited by a dotted line on the screen. At that time, a signal voltage Vsin applied to pixel electrodes 101 in the predetermined area is for example +V1.

In a frame shown in FIG. 15B as a frame appearing at a time t22 after the time t21, the ball 110 has been moved so that, in the predetermined area B, the black background image is displayed. At that time, the signal voltage Vsin applied to pixel electrodes 101 in the predetermined area is 0. In a frame shown in FIG. 15C as a frame appearing at a time t23 after the time t22, the ball 110 has been moved so that, in the predetermined area B, the black background image is again displayed. At that time, the signal voltage Vsin applied to pixel electrodes 101 in the predetermined area is again 0. In a frame shown in FIG. 15D as a frame appearing at a time t24 after the time t23, the ball 110 has been moved so that, in the predetermined area B, the black background image is again displayed. At that time, the signal voltage Vsin applied to pixel electrodes 101 in the predetermined area is also 0.

Thus, the DC level of the signal voltage Vsin applied to pixel electrodes 101 in the predetermined area is 0.25×(+V1). In this case, the DC level is an average of the DC levels for the four frames. As time goes by, the DC level of the signal voltage Vsin decreases.

As described above, in the case of a moving-image signal displayed as a signal representing an ordinary image, by inverting the polarity of the signal voltage Vsin applied to the pixel electrodes 101, the DC level of the signal voltage can be brought to 0 or brought gradually to approach 0. Thus, as is generally known, the burn-in phenomenon does not occur in the liquid-crystal display device 100.

Then, let us consider a case in which a moving image representing a swinging ball 110 serving as a white object existing on a black background image 111 is displayed on the liquid-crystal display device 100 adopting the polarity inversion driving as shown in FIG. 16. The ball 110 is swinging like a pendulum. In order to make the phenomenon easy to understand, it is assumed that the ball 110 swings from the left end to the right end or vice versa in two frame periods. It is to be noted that FIG. 16 is a diagram showing the moving image representing four consecutive frames.

In a frame shown in FIG. 16A as a frame appearing at a time t31, the ball 110 is displayed in a predetermined area C delimited by a dotted line on the screen. At that time, a signal voltage Vsin applied to pixel electrodes 101 in the predetermined area is for example +V1.

In a frame shown in FIG. 16B as a frame appearing at a time t32 after the time t31, the ball 110 has been moved so that, in the predetermined area C, the black background image is displayed. At that time, the signal voltage Vsin applied to pixel electrodes 101 in the predetermined area is 0.

In a frame shown in FIG. 16C as a frame appearing at a time t33 after the time t32, the ball 110 is again displayed in the predetermined area C delimited by the dotted line on the screen. At that time, the signal voltage Vsin applied to pixel electrodes 101 in the predetermined area is for example again +V1.

In a frame shown in FIG. 16D as a frame appearing at a time t34 after the time t33, the ball 110 has been moved again so that, in the predetermined area C, the black background image is again displayed. At that time, the signal voltage Vsin applied to pixel electrodes 101 in the predetermined area C is again 0.

Thus, the DC level of the signal voltage Vsin applied to pixel electrodes 101 in the predetermined area C is 0.5×(+V1). In this case, the DC level is an average of the DC levels for the four frames.

As described above, the DC level of the signal voltage Vsin applied to pixel electrodes 101 in the predetermined area remains at 0.5×(+V1) even if the display of the image continues. In addition, also for a case in which an image is displayed as an image repeating a movement every multiple of a driving period of inverting the applied voltage from a positive polarity to a negative one or vice versa, a predetermined DC level is applied to the pixel electrodes 101 in the same way.

As described above, even if driving is carried out as driving to periodically invert the applied voltage from a positive polarity to a negative one or vice versa, the DC level of the signal voltage Vsin is generated even in an operation to display an object image varying its period to synchronize itself to the frame period.

A moving image repeating such a periodical movement is recognized also as typically a computer-graphic image or the like. Thus, even if driving is carried out as driving to periodically invert the applied voltage from a positive polarity to a negative one or vice versa, in some cases, it is quite within the bounds of possibility that the burn-in phenomenon occurs in the liquid crystal panel.

As described above, even for whatever case of displaying a whatever image, it is desirable to provide an apparatus for driving an optical device avoiding the burn-in phenomenon, a method adopted by such an apparatus and a display apparatus employing such an optical device.

In accordance with an embodiment of the present invention, there is provided a driving apparatus for driving a display optical device having: a variable-optical-characteristic layer having an optical characteristic varying in accordance with the strength of an electrical field; and pixel electrodes and a facing electrode, which are provided at respectively pixel-electrode positions and a facing-electrode position facing the pixel-electrode positions so as to sandwich the variable-optical-characteristic layer.

The driving apparatus includes: a driving section for changing the optical characteristic of the variable-optical-characteristic layer in accordance with a moving-image signal by application of a voltage representing the moving-image signal between the pixel electrodes and the facing electrode; and an inversion control section for inverting the polarity of the voltage applied between the pixel electrodes and the facing electrode every period with a length equal to n times the length of a frame period based on the moving-image signal where n is an integer at least equal to 1. The inversion control section changes the phase of a control signal for inverting the polarity.

In addition, in accordance with another embodiment of the present invention, there is provided a display apparatus having: a display optical device including a variable-optical-characteristic layer having an optical characteristic varying in accordance with the strength of an electrical field, pixel electrodes and a facing electrode, which are provided at respectively pixel-electrode positions and a facing-electrode position facing the pixel-electrode positions so as to sandwich the variable-optical-characteristic layer, a driving section for changing the optical characteristic of the variable-optical-characteristic layer in accordance with a moving-image signal by application of a voltage representing the a moving-image signal between the pixel electrodes and the facing electrode, and an inversion control section for inverting the polarity of the voltage applied between the pixel electrodes and the facing electrode every period with a length equal to n times the length of a frame period based on the moving-image signal where n is an integer at least equal to 1. The inversion control section changes the phase of a control signal for inverting the polarity.

In accordance with a further embodiment of the present invention, there is provided a driving method for driving a display optical device having: a variable-optical-characteristic layer having an optical characteristic varying in accordance with the strength of an electrical field; and pixel electrodes and a facing electrode, which are provided at respectively pixel-electrode positions and a facing-electrode position facing the pixel-electrode positions so as to sandwich the variable-optical-characteristic layer.

The driving method includes the steps of: driving the display optical device by changing the optical characteristic of the variable-optical-characteristic layer in accordance with a moving-image signal by application of a voltage representing the a moving-image signal between the pixel electrodes and the facing electrode; inverting the polarity of the voltage applied between the pixel electrodes and the facing electrode every period with a length equal to n times the length of a frame period based on the moving-image signal where n is an integer at least equal to 1; and changing the phase of a control signal for inverting the polarity.

In the driving apparatus, the driving method and the display apparatus, which are provided in accordance with their respective embodiments of the present invention, in an operation to drive the display optical device, the polarity of a signal voltage applied between the pixel electrodes and the facing electrode is inverted every period with a length equal to n times the length of a frame period of a moving-image signal, and the phase of a control signal for inverting the polarity is changed.

Thus, in the driving apparatus, the driving method and the display apparatus, which are provided in accordance with their respective embodiments of the present invention, even for whatever case of displaying a whatever image, a DC level is never applied and a burn-in phenomenon never occurs. As a result, the life of the display apparatus becomes longer.

BRIEF DESCRIPTION OF THE DRAWINGS

These and other objects and features of the present invention will become clear from the following description of the preferred embodiments given with reference to the accompanying diagrams, in which:

FIG. 9 is a diagram showing further typical timings to change the polarity of the signal voltage Vsin in accordance with an embodiment of the present invention;

FIG. 10 is a diagram showing a model representing the configuration of a liquid-crystal display device;

FIG. 11 is a diagram showing a transmittivity characteristic of a liquid crystal in terms of a relation between a transmittivity and a voltage applied between pixel electrodes and a facing electrode;

FIG. 12 is an explanatory diagram referred to in describing an image interpolation process to shorten a frame period;

FIG. 13 is a diagram showing a control signal for carrying out frame inversion processing;

DETAILED DESCRIPTION OF THE PREFERRED EMBODIMENTS

The following description explains an apparatus for displaying a moving image by using a liquid-crystal display device according to an embodiment of the present invention.

Figure 1:
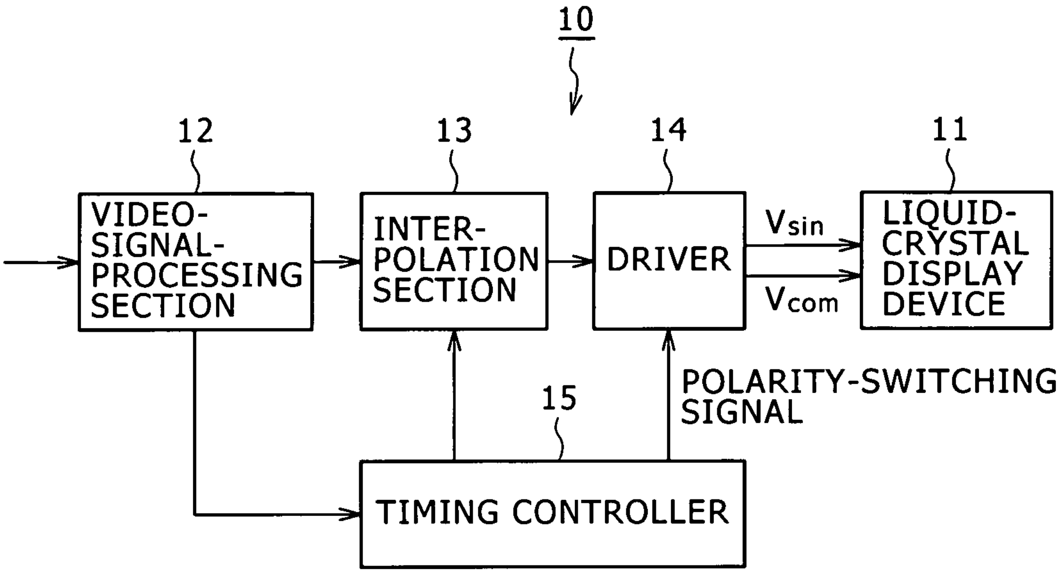
FIG. 1 is a block diagram showing a display apparatus according to an embodiment of the present invention.

FIG. 1 is a block diagram showing a display apparatus 10 according to an embodiment of the present invention.

As shown in FIG. 1, the display apparatus 10 includes a liquid-crystal display device 11, a video-signal-processing circuit 12, an interpolation circuit 13, a driver 14 and a timing controller 15.

Figure 2:
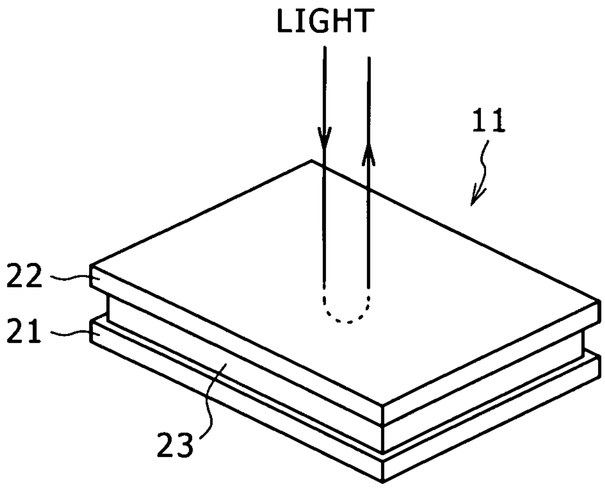
FIG. 2 is a diagram showing a perspective view of a model representing a reflection-type liquid-crystal display device.
Figure 3:
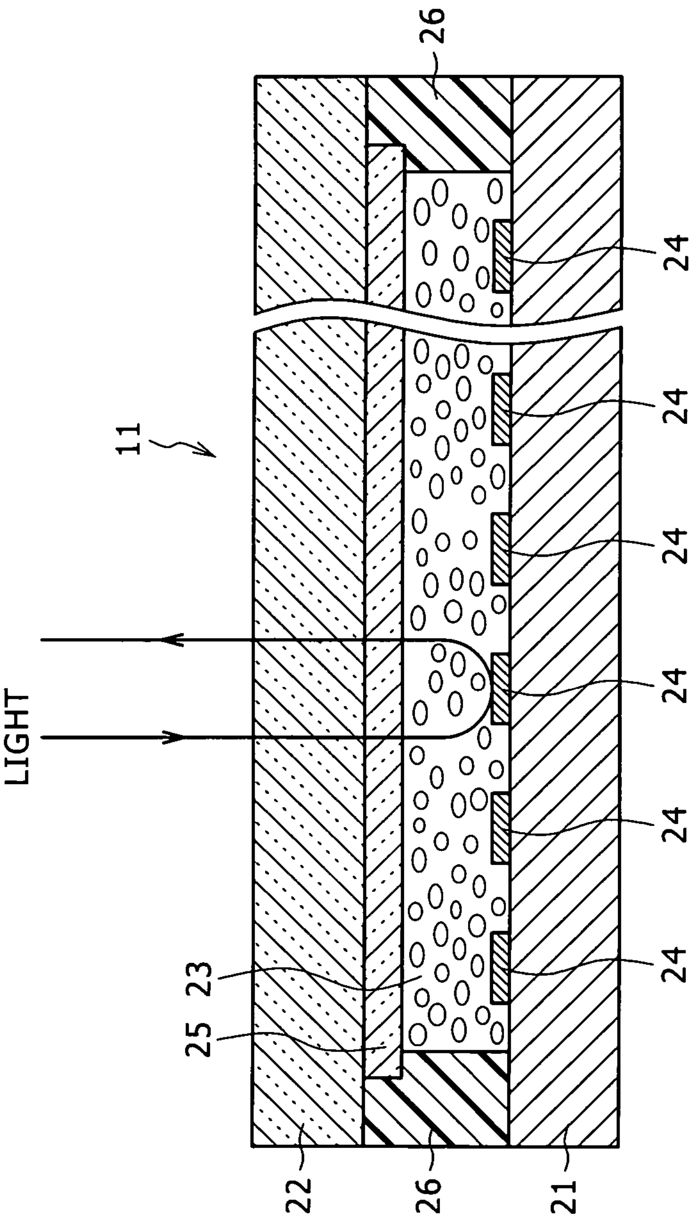
FIG. 3 is a diagram showing a cross-sectional view of a model representing a reflection-type liquid-crystal display device.

FIG. 2 is a diagram showing a perspective view of a model representing the reflection-type liquid-crystal display device 11. On the other hand, FIG. 3 is a diagram showing a cross-sectional view of the model representing the reflection-type liquid-crystal display device 11.

The liquid-crystal display device 11 is a reflection-type liquid-crystal display device referred to as the so-called LCOS (Liquid Crystal on Silicon) employing a silicon substrate, on which a MOSFET is created, as one of its substrates.

The liquid-crystal display device 11 has a driving-circuit substrate 21, a facing substrate 22 and a liquid crystal 23. The driving-circuit substrate 21 is a monolithic silicon substrate created as a thin plate. The facing substrate 22 is a transparent glass substrate also created as a thin plate.

A plurality of pixel electrodes 24 is provided on the main face of the driving-circuit substrate 21. On an entire screen display area of the facing substrate 22, a facing electrode 25 made of a transparent conductive material such as the ITO is created. The driving-circuit substrate 21 and the facing substrate 22 are attached to each other through a seal material 26 on edge portions in such a way that the pixel electrodes 24 face the facing electrode 25 and a gap having a predetermined thickness is sandwiched between the pixel electrodes 24 and the facing electrode 25. The liquid crystal 23 is inserted into the gap sandwiched between the pixel electrodes 24 and the facing electrode 25. The liquid crystal 23 has an orientation and a transmittivity, which vary in accordance with the strength of an electrical field applied to the liquid crystal 23.

Figure 4:
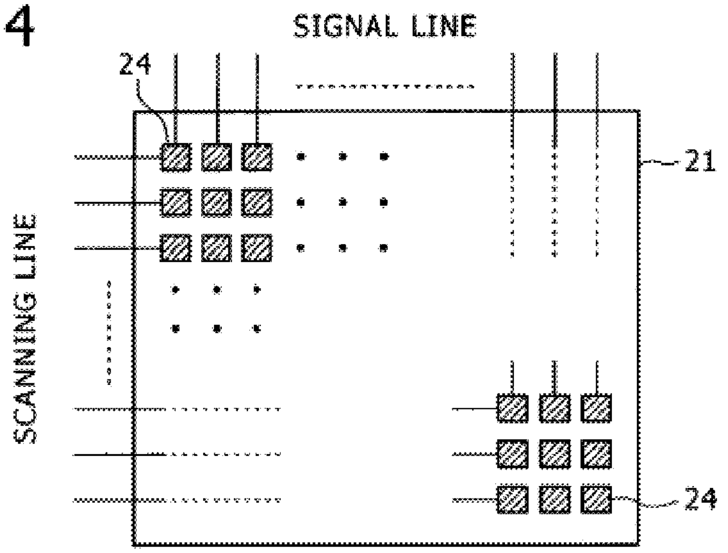
FIG. 4 is a diagram showing a 2-dimensional layout of pixel electrodes.
Figure 5:
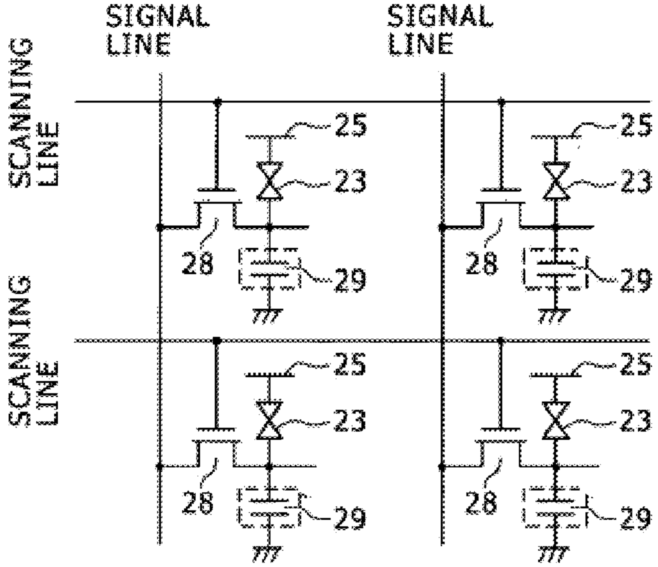
FIG. 5 is a diagram showing a switch circuit of each pixel electrode.

As shown in FIG. 4, the pixel electrodes 24 are provided at their respective pixel positions on the screen display area to form a 2-dimensional matrix. The pixel electrodes 24 are each connected to a MOS switch 28 and a capacitor 29, which are provided at a cross point of a scanning line (or a horizontal line) and a signal line (or a vertical line) as shown in FIG. 5. Due to an active-matrix method, a signal voltage Vsin representing a video signal is applied to the pixel electrodes 24. On the other hand, a reference voltage for the signal voltage Vsin is applied to the facing electrode 25. This reference voltage is also referred to as a common voltage Vcom.

When a signal voltage Vsin is applied to a pixel electrode 24 in the liquid-crystal display device 11 described above, a difference in electric potential is generated between the facing electrode 25 and the pixel electrode 24 and can be used to control the amount of optical transmission. Thus, when an optical beam is applied from the outside of the facing substrate 22 and the liquid crystal 23 reflects the optical beam, the characteristic of the optical beam reflected at the position corresponding to the pixel electrode 24 can be changed. For example, the characteristic of the optical beam is changed to modify the quantity of light simply transmitted through the liquid crystal 23 or to change the polarization direction to mention a few.

In addition, in the reflection-type liquid-crystal display device 11 also referred to as the so-called LCOS (Liquid Crystal on Silicon), the driving speed is extremely high in comparison with a generally used TFT. Thus, interpolation processing to be described later can be carried out to perform a process to increase the speed to change an image.

The video-signal-processing circuit 12 shown in FIG. 1 receives a moving-image signal to be displayed on the liquid-crystal display device 11. The video-signal-processing circuit 12 carries out various kinds of video-signal processing on the input moving-image signal. The video-signal processing includes a synchronization separation process, a process to convert the moving-image signal into component video signals, i.e., the R, G and B signals, a gain adjustment process and an inverse gamma interpolation process.

The interpolation circuit 13 receives a video signal completing the video-signal processing carried out by the video-signal-processing circuit 12. The interpolation circuit 13 generates at least one new frame between two consecutive frames (or pictures) of the input video signal by interpolation of the consecutive frames in order to create a new video signal composed of the original frames and the new frames. That is to say, the interpolation circuit 13 generates a video signal with a shorter new frame period from the original video signal having a typical original frame period of 16.7 ms.

The driver 14 applies a voltage to each of the scanning lines (or the horizontal lines) and the signal lines (or the vertical lines) in the liquid-crystal display device 11 by adoption of the active-matrix method in accordance with the new video signal generated by the interpolation circuit 13 as a video signal having a short frame period. To put it in detail, while the scanning lines (or the horizontal lines) are being sequentially switched, a signal voltage Vsin according to the video signal is applied to the signal lines (or the vertical lines). In this way, a predetermined signal voltage Vsin can be applied to a desired pixel electrode 24 so that a picture of one frame can be displayed on the liquid-crystal display device 11.

The timing controller 15 generates synchronization timings of the new video signal obtained as a result of the interpolation and supplies the timings to the driver 14. The synchronization timings are a frame timing and timings to drive the scanning lines. The timing controller 15 also generates a control signal for controlling the polarity of a signal voltage Vsin to be applied to a signal line and supplies the control signal to the driver 14.

Next, a control timing to control the polarity of the signal voltage Vsin is explained.

In the display apparatus 10, frame inversion driving is carried out to prevent a burn-in phenomenon from occurring in the liquid crystal 23 employed in the liquid-crystal display device 11. The frame inversion driving is carried out by periodically inverting the signal voltage Vsin from a positive polarity to a negative one and vice versa every image renewal period, that is, every frame (or every field). That is to say, with the common voltage Vcom applied to the facing electrode 25, the polarity of the signal voltage Vsin applied to each pixel electrode 24 is inverted every frame period with respect to the center of inversion, which coincides with the common voltage Vcom. Control to switch the polarity of the signal voltage Vsin is executed in accordance with a control signal supplied by the timing controller 15 to the driver 14 as a polarity-switching signal. It is to be noted that, in this case, the frame period is the frame period of a new moving-image signal obtained as a result of the interpolation described earlier.

Figure 6:
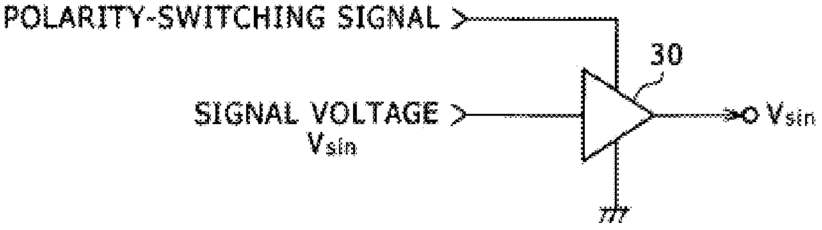
FIG. 6 is a diagram showing a driver for changing the polarity of a signal voltage Vsin.

In addition, in order to carry out the frame inversion driving, the driver 14 is provided with a buffer circuit 30 having a bias power supply changed over like one shown in FIG. 6. The bias power supply of the buffer circuit 30 is changed over from a plus side to a minus side and vice versa to invert the polarity of the signal voltage Vsin with a timing to apply the signal voltage Vsin on the positive-polarity side and a timing to apply the signal voltage Vsin on the negative-polarity side.

As described above, in the display apparatus 10, the polarity of the signal voltage Vsin applied to each pixel electrode 24 is inverted every frame period with respect to the center of inversion, which coincides with the common voltage Vcom. In addition, an inversion phase is changed periodically. To put it in detail, the inversion phase is shifted periodically by 180 degrees at one time.

Figure 7:
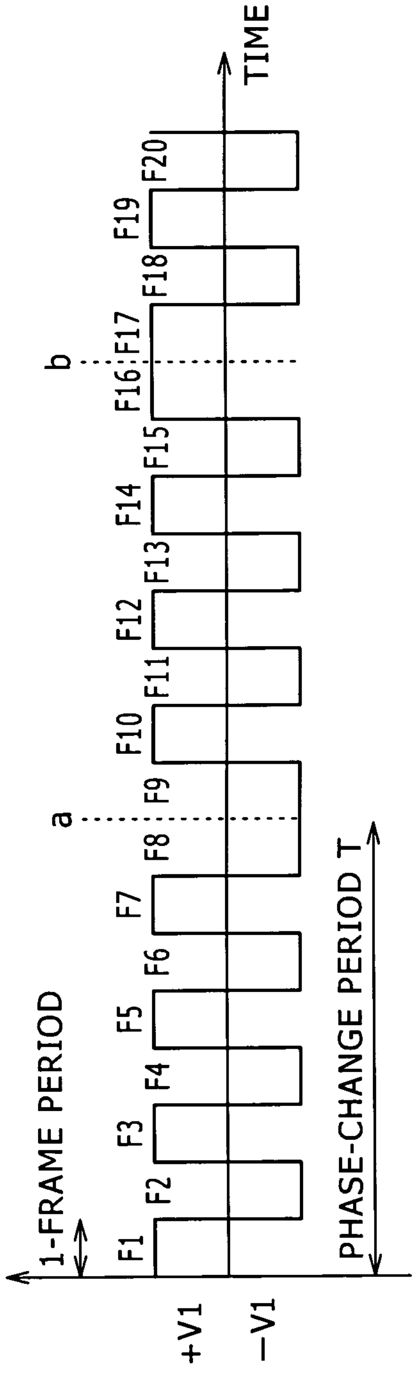
FIG. 7 is a diagram showing timings to change the polarity of the signal voltage Vsin in accordance with an embodiment of the present invention.

To put it concretely, FIG. 7 shows timing to switch the polarity of the signal voltage Vsin.

As shown in FIG. 7, the polarity of the signal voltage Vsin is switched basically every frame period, which is the frame period of the new moving-image signal obtained as a result of the interpolation described earlier. That is to say, the signal voltage Vsin is changed over from a signal voltage +V1 on the positive-polarity side to a signal voltage −V1 on the negative-polarity side every frame.

Furthermore, the phase of the polarity of the signal voltage Vsin is inverted every predetermined period of time, which is eight frames in the case of an example shown in FIG. 7. That is to say, the phase of a switching signal is changed by 180 degrees every predetermined period of time. Thus, frames sandwiching a switching point of a phase inversion are frames of signal voltages Vsin having the same polarity. In the case of the example shown in FIG. 8, examples of the switching point of a phase inversion are times a and b.

As described above, the liquid-crystal display device 11 employed in the display apparatus 10 is subjected to the frame inversion driving and the phase of the frame inversion driving is changed every predetermined period of time (every phase change period T). Thus, even if an image moving periodically in synchronization with frame periods is displayed, the direct-current component of the signal voltage Vsin is 0. As a result, no burn-in phenomenon occurs without regard to what image is displayed.

Let us assume for example that a moving image representing a swinging ball 110 serving as a white object existing on a black background image 111 is displayed as shown in FIG. 16. Even in this case, the average of the direct-current components observed over two phase change periods T is 0, causing no burn-in phenomenon to occur.

Note that it is desirable to make the number of times the driving on the positive-polarity side is carried out in one phase change period T equal to the number of times the driving on the negative-polarity side is carried out in the same phase change period T in order to minimize the direct-current component of the signal voltage Vsin. That is to say, it is desirable to set the duration of the phase change period T at a value corresponding to an even number of frames.

Figure 8:
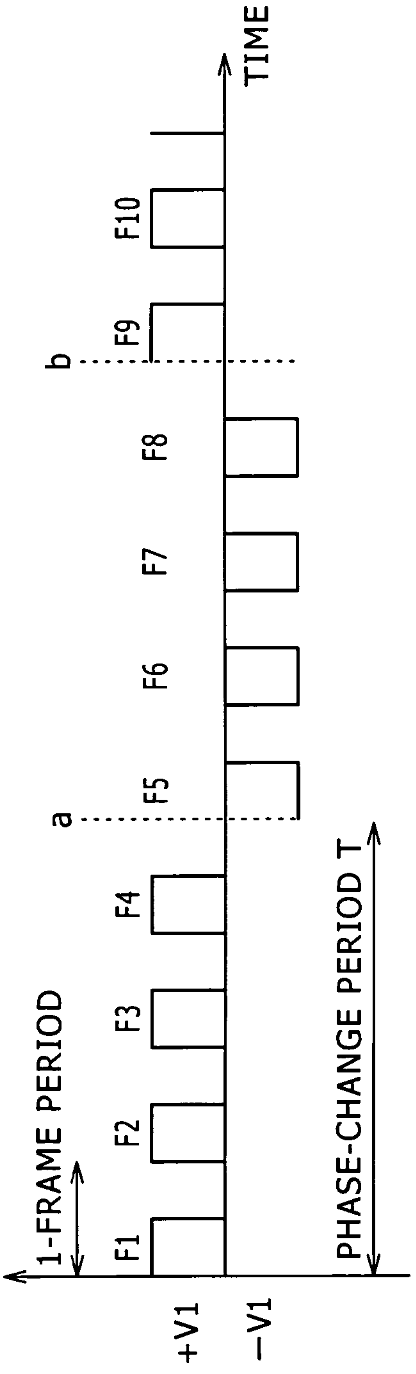
FIG. 8 is a diagram showing other typical timings to change the polarity of the signal voltage Vsin in accordance with an embodiment of the present invention.
Figure 14A:
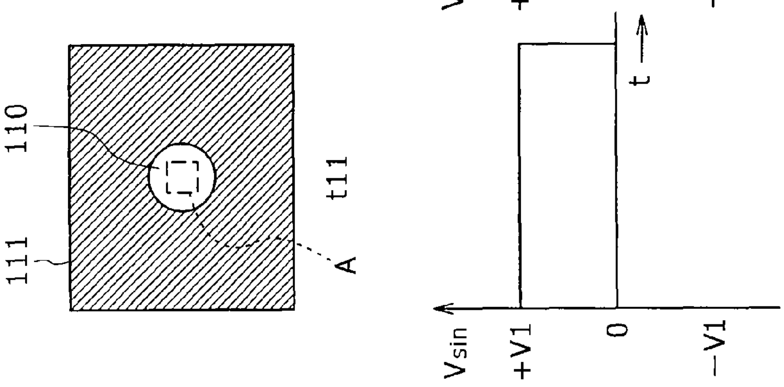
PRIOR ART FIG. 14A
FIGS. 14A to 14D are diagrams showing a moving image of a stationary white ball on a black background image.
Figure 14B:
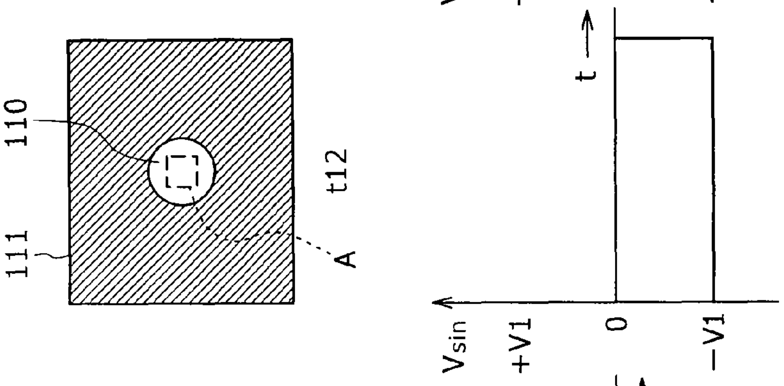
PRIOR ART FIG. 14B
Figure 14C:
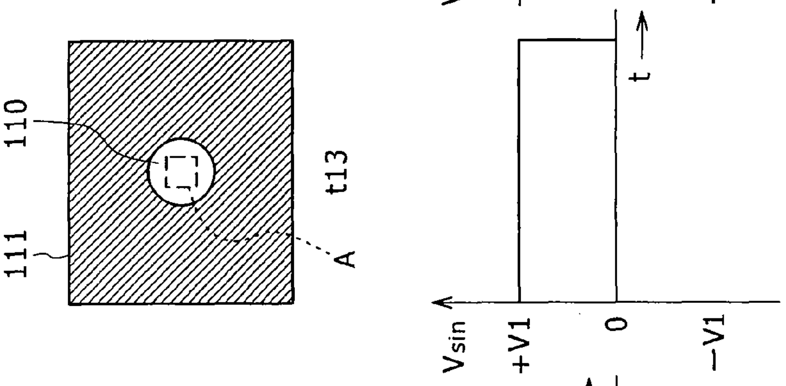
PRIOR ART FIG. 14C
Figure 14D:
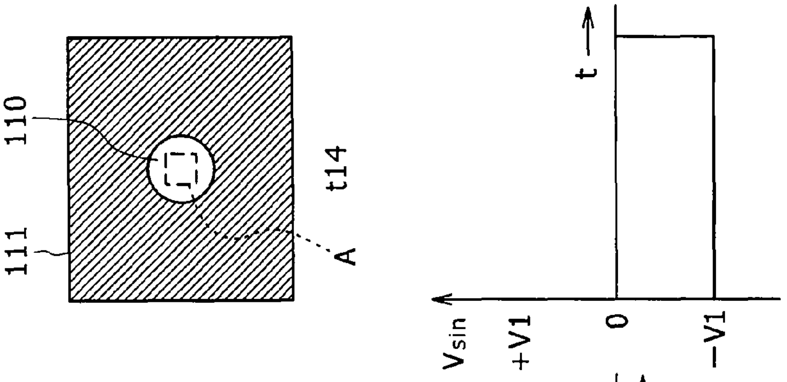
PRIOR ART FIG. 14D
Figures 15A, 15B, 15C, 15D:
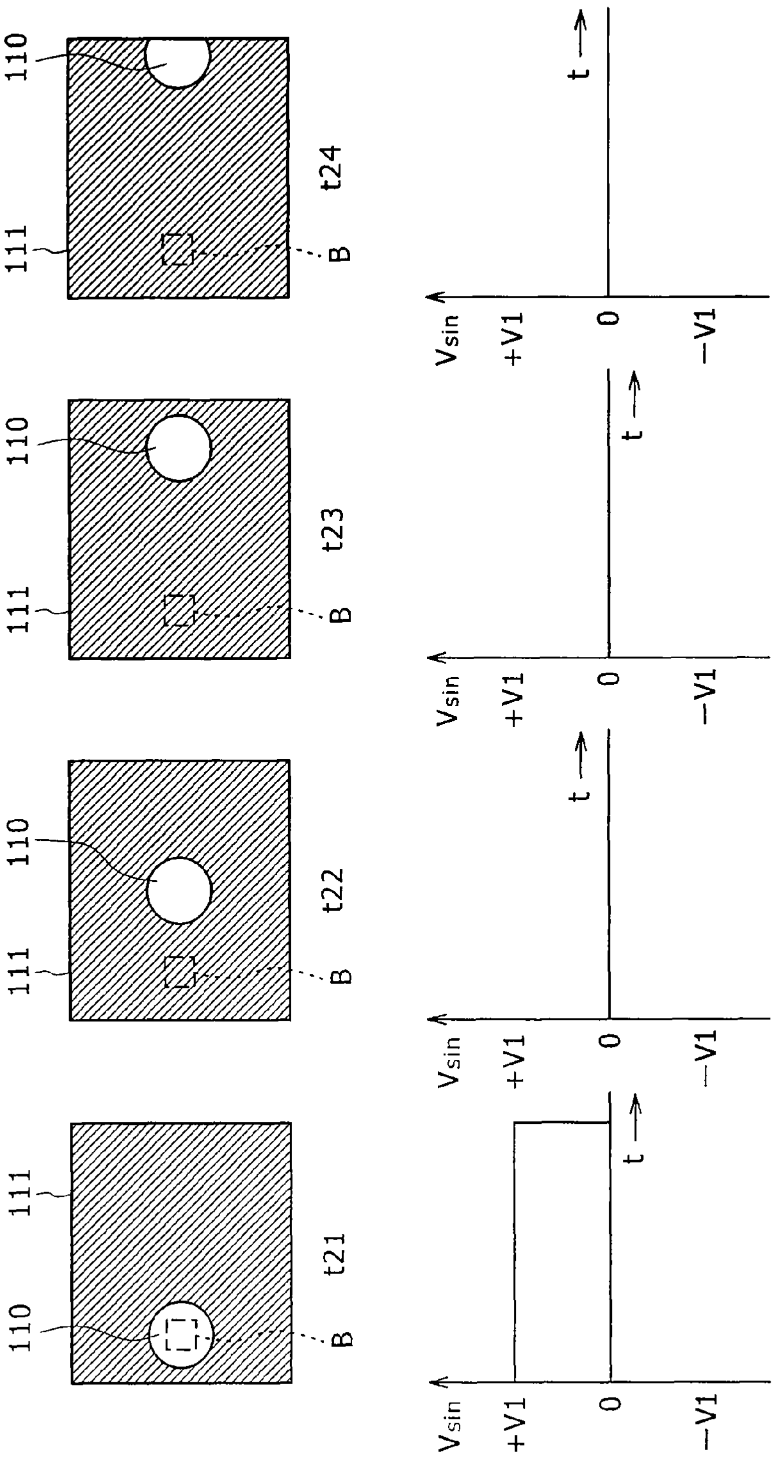
FIG. 15A PRIOR ART
FIG. 15B PRIOR ART
FIG. 15C PRIOR ART
FIGS. 15A to 15D are diagrams showing a moving image of a white ball moving in a direction over a black background image.
Figure 16A:
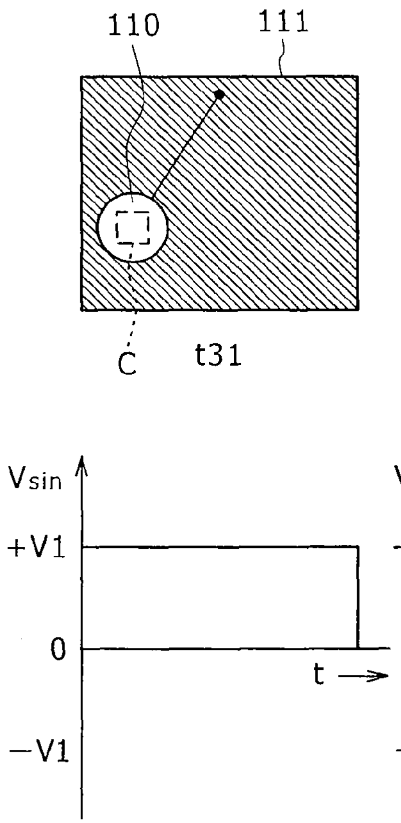
PRIOR ART FIG. 16A
FIGS. 16A to 16D are diagrams showing a moving image of a swinging white ball over a black background image.
Figure 16B:
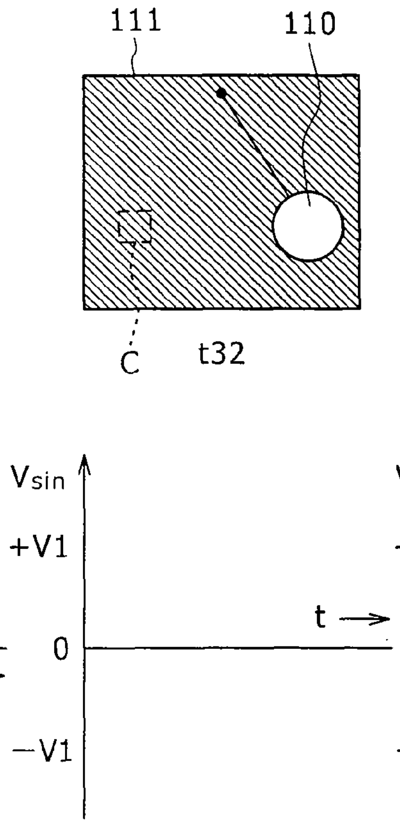
PRIOR ART FIG. 16B
Figure 16C:
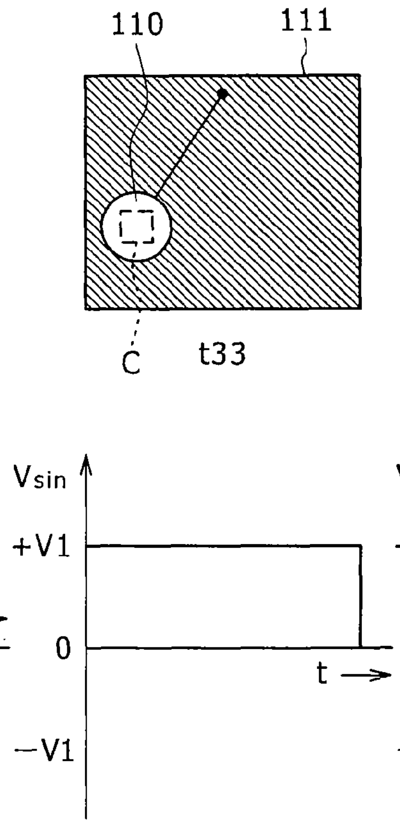
PRIOR ART FIG. 16C
Figure 16D:
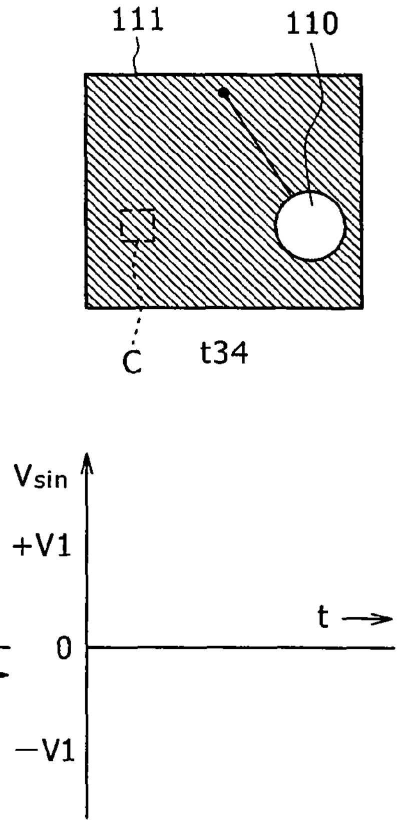
PRIOR ART FIG. 16D

In addition, the driving method is not limited to the one shown in FIG. 7. As shown in FIG. 8, the frame inversion driving can also be carried out to alternate the polarity of one side only and the black image display from a phase change period T to another period T. That is to say, in a certain phase change period T, the driving of the signal voltage Vsin on the positive-polarity side and the driving of the black image may be carried out and, in following phase change period T, the driving of the signal voltage Vsin on the negative-polarity side and the driving of the black image may be carried out.

On top of that, given a switching period P sufficiently longer than the phase change period T, the length of the phase change period T can be changed every switching period P. That is to say, each phase change period T1 consisting of typically eight frames in a switching period P composed of typically 40 frames is changed to a phase change period T2 consisting of typically eight frames in the next switching period P as shown in FIG. 9. In this case, the length of the switching period P is the least common multiple of the lengths of phase change periods T1 and T2.

Moreover, instead of changing the length of the phase change period T every switching period P as described above, the length of the phase change period T is kept at a fixed value but the phase of the frame inversion driving is inverted every switching period P.

Furthermore, the length of the phase change period T can be changed and the phase of the frame inversion driving can be inverted every switching period P.

As described above, by switching the polarity of the signal voltage Vsin to set the level of the signal voltage Vsin at 0 and make the phase of the frame inversion driving more random, a burn-in phenomenon can be prevented from occurring in the liquid crystal 23 employed in the liquid-crystal display device 11.

In the typical applications described above as applications of the present invention, a reflection-type liquid-crystal display device referred to as the so-called LCOS (Liquid Crystal on Silicon) is used. It is to be noted, however, that the scope of the present invention is not limited to that employing such a liquid-crystal display device. The present invention can be applied to any display device as long as the display device is made of a material with an optical characteristic thereof changing in accordance with an electric field. An example of such a display device is a transmission-type liquid-crystal panel.

In addition, in the display apparatus 10, the signal voltage is inverted from a positive polarity to a negative one and vice versa periodically every frame period. However, the present invention can also be applied to a display device in which the signal voltage is inverted from a positive polarity to a negative one and vice versa periodically every n frame periods where n is a natural number.

While the present invention has been described with reference to specific embodiments chosen for the purpose of illustration of the present invention, it should be apparent that numerous modifications could be made thereto by those skilled in the art without departing from the basic concept and the scope of the present invention.

What is claimed is:

1. A driving apparatus for driving a display optical device, said display optical device having (a) a variable-optical-characteristic layer with an optical characteristic which varies in accordance with a strength of an electrical field, (b) a plurality of pixel electrodes provided at respective pixel-electrode positions, and (c) a facing electrode having a position so as to face said pixel-electrode positions and so as to sandwich said variable-optical-characteristic layer, said driving apparatus comprising:

a driving section configured to vary said optical characteristic of said variable-optical-characteristic layer in accordance with a moving-image signal by application of a voltage signal representing said moving-image signal between said pixel electrodes and said facing electrode; and an inversion control section configured to invert a polarity of said voltage signal applied between said pixel electrodes and said facing electrode, said inversion control section also configured to shift a phase of a polarity-switching control signal every phase change period, wherein, said phase change period includes a plurality of frame periods, and said driving section and said inversion control section are configured such that (i) during a first phase change period, said voltage signal representing said moving-image signal and having a first polarity is applied during one portion of each frame period and a voltage signal for a black image display is applied during another remaining portion of each frame period, and (ii) during a following second phase change period, said voltage signal representing said moving-image signal and having a second polarity opposite to the first polarity is applied during one portion of each frame period and said voltage signal for the black image display is applied during another remaining portion of each frame period.

2. The driving apparatus according to claim 1, wherein said inversion control section shifts said phase of said polarity-switching control signal by 180 degrees every phase change period.

3. The driving apparatus according to claim 1, wherein said variable-optical-characteristic layer in said display optical device is a liquid-crystal layer.

4. The driving apparatus according to claim 1, wherein said display optical device is a liquid-crystal display device comprising:

a silicon substrate on which said pixel electrodes are disposed, a liquid-crystal layer on said silicon substrate, and said facing electrode, made of a transparent material, facing said liquid-crystal layer and sandwiching said liquid-crystal layer in conjunction with said silicon substrate.

5. The driving apparatus of claim 1, wherein successive phase change periods include a different number frame periods.

6. The driving apparatus of claim 1, wherein said first polarity is a positive polarity and said second polarity is a negative polarity.

7. A display apparatus comprising:

a display optical device including a variable-optical-characteristic layer having (a) an optical characteristic which varies in accordance with a strength of an electrical field, (b) a plurality of pixel electrodes provided at respective pixel-electrode positions and (c) a facing electrode having a position facing said pixel-electrode positions and so as to sandwich said variable-optical-characteristic layer;

a driving section configured to vary said optical characteristic of said variable-optical-characteristic layer in accordance with a moving-image signal by application of a voltage signal representing said moving-image signal between said pixel electrodes and said facing electrode; and an inversion control section configured to invert a polarity of said voltage signal applied between said pixel electrodes and said facing electrode, said inversion control section also configured to shift a phase of a polarity-switching control signal every phase change period, wherein, said phase change period includes a plurality of frame periods, and said driving section and said inversion control section are configured such that (i) during a first phase change period, said voltage signal representing said moving-image signal and having a first polarity is applied during one portion of each frame period and a voltage signal for a black image display is applied during another remaining portion of each frame period, and (ii) during a following second phase change period, said voltage signal representing said moving-image signal and having a second polarity opposite to the first polarity is applied during one portion of each frame period and said voltage signal for the black image display is applied during another remaining portion of each frame period.

8. The display apparatus according to claim 7, wherein said inversion control section shifts said phase of said polarity-switching control signal by 180 degrees every phase change period.

9. The display apparatus according to claim 7, wherein said variable-optical-characteristic layer in said display optical device is a liquid-crystal layer.

10. The display apparatus according to claim 7, wherein said display optical device is a liquid-crystal display device comprising:

a silicon substrate on which said pixel electrodes are disposed, a liquid-crystal layer on said silicon substrate, and said facing electrode, made of a transparent material, facing said liquid-crystal layer and sandwiching said liquid-crystal layer in conjunction with said silicon substrate.

11. The display apparatus according to claim 7, wherein:

said display apparatus further comprises an interpolation section for generating a new moving-image signal from an original moving-picture signal, and said driving section varies said optical characteristic of said variable-optical-characteristic layer in accordance with said new moving-image signal.

12. The display apparatus according to claim 7, wherein said first polarity is a positive polarity and said second polarity is a negative polarity.

* * * * *